United States Patent Office 2,838,927
Patented June 17, 1958

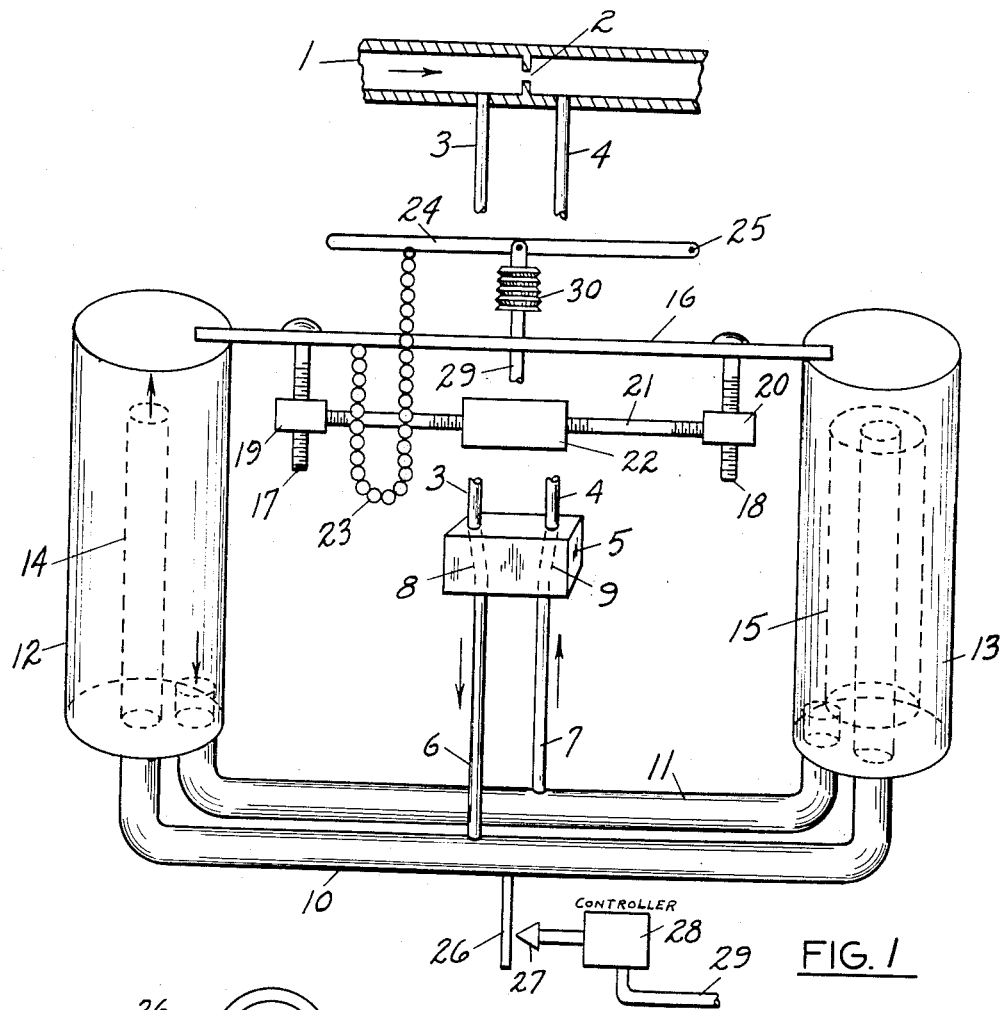
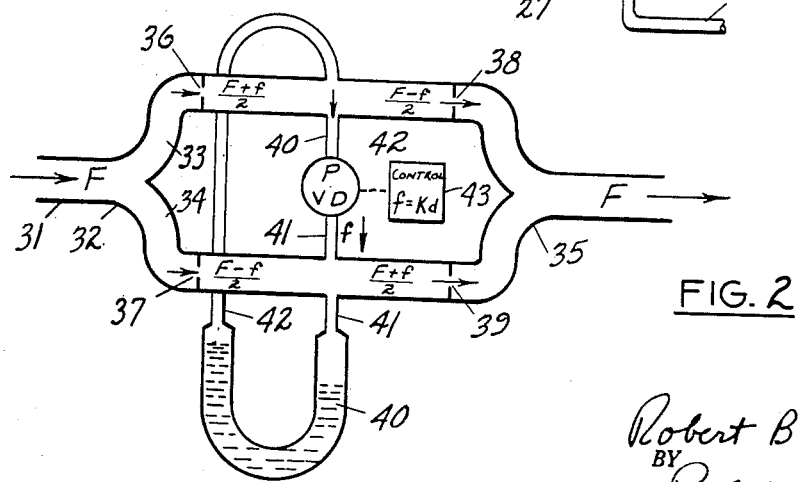

2,838,927
GAS DENSITY MEASURING DEVICE

Robert B. Gray, Erie, Pa., assignor to American Meter Company, Incorporated, Erie, Pa., a corporation of Delaware Application March 29, 1955, Serial No. 497,639

3 Claims. (Cl. 73—30)

This invention is intended to measure the density of gas in a line at the flowing temperature and pressure and to provide a linear scale indication of the mass flow of gas through an orifice.

The density of the gas is obtained by a scale balance having one one side a chamber through which gas flows and on the other side a balance weight. The density of the gas is indicated by the weight required to rebalance the scale. The mass flow (the product of flow times density) is obtained by dividing the flow into two branch lines each having a matched orifice at its upstream and downstream ends and by circulating between the branches midway between the orifices a flow proportional to the gas density. Then the differential pressure midway between the orifices in the branch lines is a linear indication of mass flow.

In the drawing, Fig. 1 is a perspective of a gas density measuring device, and Fig. 2 is a diagram of an arrangement for obtaining a linear scale of flow through an orifice.

In Fig. 1 of the drawing, there is shown a gas pipe line 1 having an orifice 2 for measuring the flow of gas. While the pressure drop across the orifice 2 gives an indication of the flow, correction must be made for pressure, temperature, and super compressibility, in order that the actual quantity of gas flowing through the orifice may be determined. These correction factors would not have to be made if the actual density of the gas at its flowing temperature and pressure were known. Then the product of the flow through the orifice by the density of the gas flowing through the orifice would give the total quantity of gas without the need for any additional correction factors.

In order to measure the density of the gas flowing through the orifice, a small sample of the gas flowing through the orifice is by-passed around the orifice through an instrument for measuring the density of the gas. The quantity by-passed around the orifice is so small as to be negligible but it does provide a continuous sample at the flowing temperature and pressure which can be used for measuring the density. The sample flows from the line 1 through a conduit 3 on the upstream side of the orifice and back through a conduit 4 on the downstream side of the orifice. The conduits 3 and 4 are connected to a rigid support 5 from which a pair of inlet and outlet tubes 6 and 7 depend. The tubes 6 and 7 are of relatively thin-walled tubing and have appreciable resilience. The tubes are of very small diameter so that even with thin wall high pressures can be withstood. The tube 6 is connected by a passageway 8 to a conduit 3 and the tube 7 is connected by a passageway 9 to the conduit 4. The tube 6, accordingly, serves as the inlet for the gas sample and the tube 7 serves as the outlet. At the lower end, the tubes 6 and 7 are respectively fixed to rigid pipes 10 and 11. While the tubes 6 and 7 are of small diameter and have thin walls so as to have appreciable resilience, the pipes 10 and 11 are of relatively large diameter and of sufficient wall thickness so as to be effectively rigid. The resilience of the tubes 6 and 7 are so related to the total mass of the movable portion of the system that the restoring torque of the tubes equals the deflecting torque of the mass when it is displaced. The gas flowing through the tube 6 into the pipe 10 branches and flows in opposite directions to a measuring chamber 12 and a counter-balance chamber 13. The gas flowing into the measuring chamber 12 is discharged near the top through a stand pipe 14. The gas flowing into the counter-balance chamber flows up through the center of a filler member 15. The filler member 15 takes up most of the internal space in the counter-balance chamber 13 so that there is a net differential between the internal volumes 12 and 13 corresponding to the volume of the gas sample to be weighed. The chambers 12 and 13 while of different volume are designed to have essentially the same internal surface area so that the coatings building up on the internal surface will balance out and not affect accuracy of the gas measurement. The gas flows back to the tube 7 through the pipe 11 opposite ends of which are connected to the bottoms of the chambers 12 and 13. At the top, the chambers 12 and 13 are connected by a rigid cross bar 16 at opposite sides of which are studs 17 and 18 on which are threaded adjusting nuts 19 and 20. The nuts 19 and 20 are connected by a threaded member 21 carrying a weight 22. By adjusting the vertical position of the nuts 19 and 20 the center of gravity of the dead weight mass supported by the lower ends of the tubes 6 and 7 can be adjusted to be slightly below the upper ends of the tubes 6 and 7 thereby securing the maximum sensitivity. The right and left adjustment of the weight 22 along the threaded member 21 shifts the center of gravity of the dead weight mass laterally so that it corresponds with the plane of the tubes 6 and 7. The adjustment provided by the parts 17 to 22, inclusive, is a calibrating adjustment.

With the construction so far described, the parts 10 through 22, inclusive, are supported at the lower ends of flexible tubes 6 and 7. Since the tubes 6 and 7 are located between the chambers 12 and 13 and usually in a plane midway between the chambers, the tubes 6 and 7 with the mass suspended from the lower ends thereof act as a scale beam pivotally supported by the rigid support 5. The tilting or pivoting of the mass is accommodated by the flexing of the tubes 6 and 7. If the parts are in balance when there is no gas flowing, then as the gas flows the weight of the chamber 12 will overbalance the weight of the chamber 13 and the assembly will tilt or pivot in a counterclockwise direction. The amount of tilting will be proportional to the weight of the gas. However, because the sensitivity is greatest when the chambers 12 and 13 are in a balanced position, it is preferable to rebalance the system as in the usual beam scale and to obtain an indication of the density of the gas by the weight required to rebalance the system.

The weight for rebalancing the system comprises a chain 23 having one end connected to the cross-member 16 adjacent the chamber 12 and having the other end connected to a lever 24 pivoted at 25 on a rigid structure independent of the parts 6 to 22, inclusive. The chain 23 hangs freely from the cross-member 16 and the lever 24 in the form of a U-shaped loop and by pivoting the lever 24 the length of the chain supported by the cross-member 16 will be varied. This is so because one of the arms of the chain is supported by the lever 24 and the other is supported by the cross-bar 16. Accordingly, the angular position of the lever 24 serves as an indication of the amount of weight required to rebalance the system to compensate for the density of the gas received in the measuring chamber 12. As the density of the gas in the chamber 12 increases, the lever 24 moves in a clockwise direction and a smaller part of the length of the chain 23 is carried by the cross-bar 16.

In order to maintain the system in a continuous state of balance, a vane 26 is fixed to the rigid structure at the lower end of the tubes 6 and 7 and co-operates with a nozzle 27 of a pneumatic controller 28. As the structure tilts due to changes in the density of the gas in the measuring chamber 12, the vane 26 co-operates with the nozzle 27 to produce a change in pressure in the controller output line 29 which is fed to a bellows 30 connected to the pivoted lever 24. For example, if the gas in the measuring chamber 12 should become more dense, the vane 26 would move closer to the nozzle 27 and this would produce an output pressure in the line 29 tending to expand the bellows 30 and move the pivoted lever 24 in a clockwise direction. This movement would cut down the part of the chain 23 carried by the cross-bar 16 sufficient to compensate for the increase in density in gas in the measuring chamber 12. The pneumatic controller 12 will maintain the vane 26 essentially tangent to the nozzle 27 and thereby maintain the system in a balanced condition. Any change in the balance of the system which would show up as a movement of the vane 26 relative to the nozzle 27 would immediately result in a change in the output pressure appearing in line 29 of the controller which would move the lever 24 in the direction to rebalance the system. Accordingly, the position of the lever 24 serves as an indication of the density of the gas in the measuring chamber 12.

In Fig. 2 is shown an arrangement for obtaining a linear scale of the total gas flow through an orifice. In the usual orifice meter for measuring gas flow, the scale is not linear but is a squared scale so that outputs of two orifice meters cannot be added directly without square root extraction. In the construction of Fig. 2, the gas line 31 in which flow is to be measured is divided at point 32 into equal branches 33 and 34 which reconverge at point 35. The branches 33 and 34 are of equal size and on the upstream ends have matched orifices 36 and 37. Similarly matched orifices 38 and 39 are on the downstream ends. At a point midway between the orifices 36 and 38 is a suction line 40 and at a point midway between the orifices 37 and 39 is a discharge line 41. The lines 40 and 41 are connected to a variable discharge pump 42 having a control 43 which maintains the flow $f$ in the lines 40 and 41 proportional to the density of the gas. The flow through the lines 40 and 41 will ordinarily be a small faction, for example, 10% or less of the maximum flow in the line 31. With this construction, the flow F in the line 31 will divide through the branches 33 and 34 and will have the value $$\frac{F+f}{2}$$

downstream of the orifice 36, $$\frac{F-f}{2}$$

downstream of the orifice 37, $$\frac{F-f}{2}$$

upstream of the orifice 38, and $$\frac{F+f}{2}$$

upstream of the orifice 39. This results from the fact that a flow $f$ is withdrawn from the branch 33 between the orifices 36 and 38 and is added to the branch 34 between the orifices 37 and 39. The pressure in the branch 34 at a point midway between the orifices 37 and 39 will accordingly be higher than the pressure in the branch 33 midway between the orifices 36 and 38. This must necessarily be the case because the pressure and flow at both ends of the branches 33 and 34 is the same and there is at smaller flow through the orifice 37 than through the orifice 36 which results in a smaller pressure drop through the orifice 37 than through the orifice 36. The measurement of the flow is obtained by a differential pressure measuring device indicated as U-tube 40 having one end 41 connected to the branch 34 midway between the orifices 37 and the other end 42 connected to the branch 33 midway between the orifices 36 and 38. Since the orifices 36—39 are of equal size and have the same characteristics, the pressure drop through the orifice 36 will be proportional to $$\left(\frac{F+f}{2}\right)^2$$

and the pressure drop through the orifice 37 will be proportional to $$\left(\frac{F-f}{2}\right)^2$$

where F is the flow in the line 31 and $f$ is the flow through the pump 42. When the pressure drops corresponding to the flows through the orifices 36 and 37 are subtracted by the differential pressure measuring device 40, the net resultant differential pressure is $$F^2+2Ff+f^2-F^2+2fF-F^2=Ff=Fkd$$

where $d$ is the density of the gas at the flowing pressure and temperature and $k$ is a proportionality constant. This indication is linear for all conditions and gives a true indication of mass flow through the line 31.

If the pump 42 were controlled so that the flow $f$ were proportional to the pressure, then the same linear relationship would be obtained but the indication of the differential measuring device would be equal to FkP where F is the flow in line 31, P is the pressure in line 31, and $k$ is a proportionality constant. When the flow through the pump 42 is controlled in proportion to the pressure in line 31, then there is no compensation for the super compressibility of the gas flowing through the orifices 36—39. However, the indication of flow is linear so that the flows of any number of measuring devices can be added without extracting square roots or making other corrections.

What is claimed as new is:

1. In a device for measuring gas density at flowing pressure in a gas line, a support, an inlet way in the support connected to an upstream point in the gas line, an outlet way in the support connected to a downstream point in the gas line, resilient inlet and outlet tubes vertically depending from the support and having upper ends connected respectively to the inlet and outlet ways, a rigid structure fixed to and supported by and sealed to the lower ends of the tubes having a sealed chamber spaced on one side of the tubes and a counter-balance weight spaced on the other side of the tubes whereby the structure functions as a scale beam and the tubes serve as the pivot for the beam, said structure having a line leading from the lower end of the inlet tube to the chamber and another line leading from the chamber back to the lower end of the outlet tube whereby a sample of gas flows through the chamber, and means for adding known weights to the structure to rebalance the structure to compensate for the weight of gas in the chamber.

2. The structure of claim 1 in which the means for rebalancing the structure comprises an independent structure, a U-shaped chain, one arm of which is connected to and depends from said rigid structure at one side of the tubes and the other arm of which is connected to and depends from said independent structure, and means for raising and lowering said independent structure to vary the length of the arms of the U-shaped chain and thereby determines the proportion of the weight of the chain carried by said rigid structure.

3. In a device for measuring gas density at flowing pressure in a gas line, a support, an inlet way in the support connected to an upstream point in the gas line, an outlet way in the support connected to a downstream point in the gas line, resilient inlet and outlet tubes depending from the support and having upper ends connected respectively to the inlet and outlet ways, a rigid structure fixed to and supported by and sealed to the lower ends of the tubes having a sealed chamber spaced on one side of the tubes and a counterbalance weight spaced on the other side of the tubes whereby the structure functions as a scale beam, said counter-balance weight comprising another sealed chamber of lesser volume but of the same internal surface area as the first chamber whereby errors due to build up of gum coatings on the inner surfaces of the chambers are compensated, said structure having lines leading from the lower end of the inlet tube to each of the sealed chambers and other lines leading from each of the sealed chambers back to the lower end of the outlet tube whereby a sample of gas flows through both of the chambers and the difference in volume of the chambers represents the weight of the gas to be measured, and means for adding known weights to the beam structure to rebalance the structure to compensate for changes in the weight of the gas in the chambers.

References Cited in the file of this patent

UNITED STATES PATENTS

| | | |
|---|---|---|
| 527,397 | Arndt | Oct. 16, 1894 |
| 676,858 | Arndt | June 18, 1901 |
| 1,308,626 | Crowell | July 1, 1919 |
| 1,761,295 | Greenfield | June 3, 1930 |
| 1,787,256 | Lima | Dec. 30, 1930 |
| 2,023,164 | Cady | Dec. 3, 1935 |
| 2,106,966 | Binckley | Feb. 1, 1938 |
| 2,263,335 | Heinz | Nov. 18, 1941 |
| 2,613,530 | Nichols | Oct. 14, 1952 |
| 2,662,394 | McMahon | Dec. 15, 1953 |
| 2,775,893 | Nett | Jan. 1, 1957 |

FOREIGN PATENTS

| | | |
|---|---|---|
| 691,312 | Great Britain | May 13, 1953 |